United States Patent
Alur Shivaswamy et al.

(10) Patent No.: US 12,464,452 B2
(45) Date of Patent: Nov. 4, 2025

(54) ADAPTIVE LOAD BASED POWER SAVING IN COMMUNICATION NETWORK

(71) Applicant: RAKUTEN SYMPHONY, INC., Tokyo (JP)

(72) Inventors: Praveen Kumar Alur Shivaswamy, Bangalore (IN); Venkatarao Malempati, Bangalore (IN); Jay Navali, Massachusetts, MA (US); Venkateswara Reddy Peram, Bangalore (IN); Arun Shankar Shivashankarappa, Bangalore (IN); Mahesh Sivapuram, Bangalore (IN); Lokesh Chimbili, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 370 days.

(21) Appl. No.: 18/191,850

(22) Filed: Mar. 28, 2023

(65) Prior Publication Data

US 2024/0334322 A1  Oct. 3, 2024

(51) Int. Cl.
*H04W 52/02* (2009.01)
(52) U.S. Cl.
CPC .............. *H04W 52/0203* (2013.01)

(58) Field of Classification Search
CPC .................................... H04W 52/0203
See application file for complete search history.

(56) References Cited

U.S. PATENT DOCUMENTS

| | | | | |
|---|---|---|---|---|
| 2012/0159261 | A1* | 6/2012 | Maybee | G06F 11/323 714/E11.212 |
| 2014/0089603 | A1* | 3/2014 | Krishnapura | G06F 12/0831 711/146 |
| 2014/0115366 | A1* | 4/2014 | Joo | G06F 1/06 713/323 |
| 2016/0140070 | A1* | 5/2016 | Araujo | G06F 9/542 710/310 |

* cited by examiner

*Primary Examiner* — Sun Jong Kim
(74) *Attorney, Agent, or Firm* — HAUPTMAN HAM, LLP

(57) ABSTRACT

An apparatus includes a first processor; and a memory having instructions stored thereon that, when executed by the first processor, cause the apparatus to monitor a flow of data packets on a network plane. The apparatus is also caused to calculate a packet rate of the flow of the data packets. The apparatus is further caused to compare the packet rate with a first threshold value. The apparatus is additionally caused to, in response to determining the packet rate is less than the first threshold value, cause an operating state of a second processor communicatively coupled with the apparatus to change from an active state to a sleep state.

20 Claims, 7 Drawing Sheets

ADAPTIVE LOAD BASED POWER SAVING IN COMMUNICATION NETWORK

TECHNICAL FIELD

The present disclosure is related to data processing in a communication network and saving power consumption.

BACKGROUND

Network service providers and device manufacturers (e.g., wireless, cellular, etc.) are continually challenged to provide compelling network services that are economically operated and environmentally friendly. Communication networks are often implemented by numerous network devices, networking components, servers, computers, processors, central processing units, nodes, centralized units, distributed units, data centers, etc. that consume power.

SUMMARY

An aspect of this description is directed to an apparatus comprising a first processor; and a memory having instructions stored thereon that, when executed by the first processor, cause the apparatus to monitor a flow of data packets on a network plane. The apparatus is also caused to calculate a packet rate of the flow of the data packets. The apparatus is further caused to compare the packet rate with a first threshold value. The apparatus is additionally caused to, in response to determining the packet rate is less than the first threshold value, cause an operating state of a second processor communicatively coupled with the apparatus to change from an active state to a sleep state.

Another aspect of this description is directed to a method comprising monitoring, by a first processor, a flow of data packets on a network plane. The method also comprises calculating a packet rate of the flow of the data packets. The method further comprises comparing the packet rate with a first threshold value. The method additionally comprises, in response to determining the packet rate is less than the first threshold value, causing an operating state of a second processor communicatively coupled with the apparatus to change from an active state to a sleep state.

Another aspect of this description is directed to a non-transitory computer readable medium having instructions stored thereon that, when executed by a first processor, cause an apparatus to monitor a flow of data packets on a network plane. The apparatus is also caused to calculate a packet rate of the flow of the data packets. The apparatus is further caused to compare the packet rate with a first threshold value. The apparatus is additionally caused to, in response to determining the packet rate is less than the first threshold value, cause an operating state of a second processor communicatively coupled with the apparatus to change from an active state to a sleep state.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
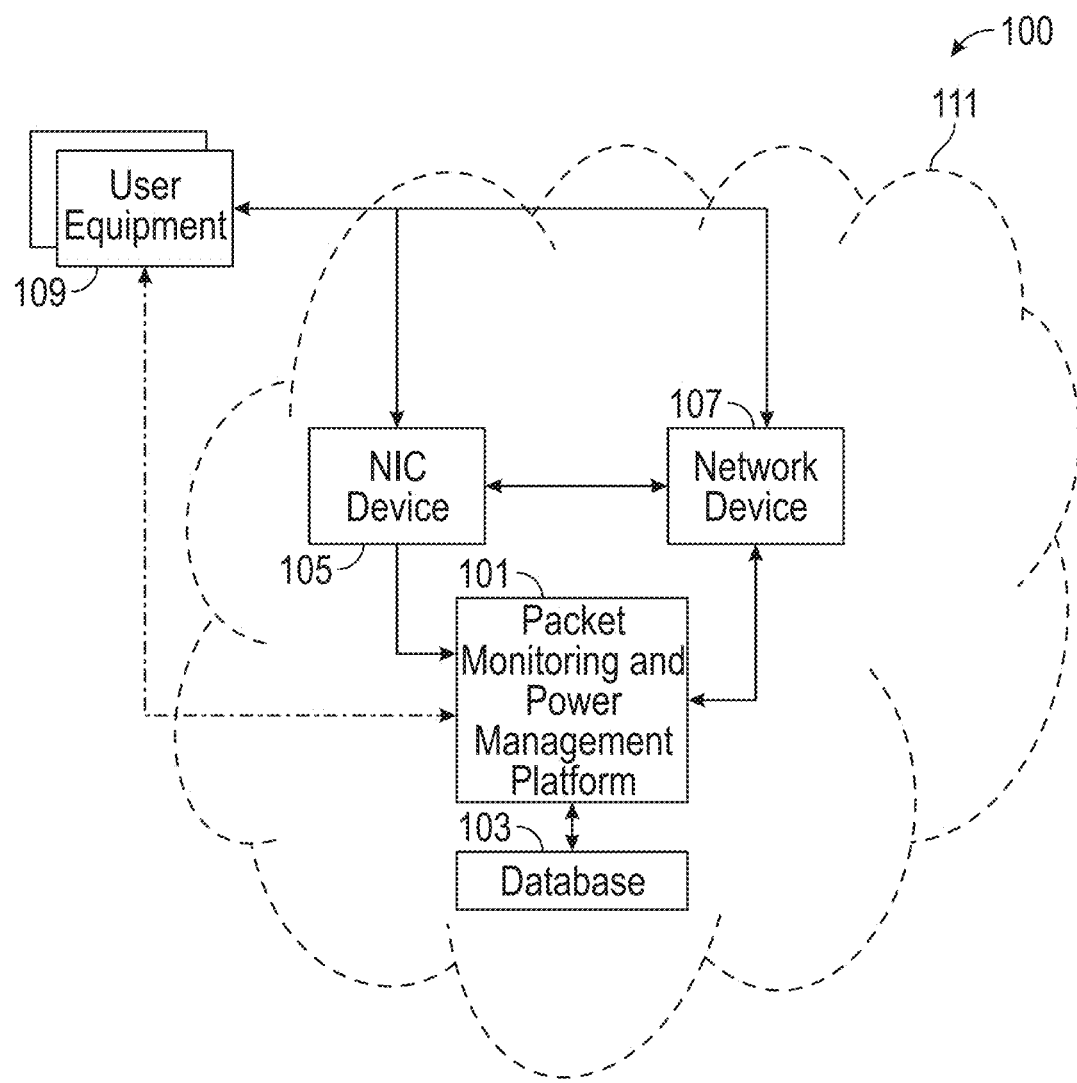
FIG. 1 is a diagram of a packet monitoring and power management system, in accordance with one or more embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, the present disclosure may omit some operations, such as a "response" or "send receipt" that corresponds to the previous operation, for the purpose of simplicity and clarity.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Network service providers and device manufacturers are continually challenged to provide compelling network services that are economically operated and environmentally friendly. Communication networks are often implemented by numerous network devices, networking components, servers, computers, processors, central processing units, nodes, centralized units, distributed units, data centers, etc. that consume power. Various types of user equipment such as mobile devices, phones, tablets, computers, gaming systems, or etc. connect to such a communication network.

The user equipment is often connected to the communication network by way of a radio access network (RAN). The RAN, for example, is responsible for managing the wireless connection between the user equipment and the communication network, and for handling the data traffic in the communication network, which often consumes a significant amount of power. As the communication network evolves and the amount of user equipment accessing the communication network increases, the power consumption and costs associated with operating the communication network also increase. Reducing power consumption by the devices used to operate the communication network would be helpful for lowering the costs of operating the communication network. For example, power management in the RAN user plane would make it possible to reduce power consumption, reduce energy bills, reduce costs associated with cooling servers, reduce operating expenses associated with providing the communication network, reduce carbon emissions, and improve energy efficiency of RAN user plane applications.

Some embodiments discussed in the present specification are directed to adaptive load-based power saving in the RAN user plane. Other applications of the adaptive load-based power saving features discussed in the present specification are optionally applicable to one or more other elements associated with operating a communication network.

In some embodiments, the systems and methods discussed herein involve monitoring a data packet traffic load in the RAN user plane and dynamically adjusting the power consumption of the user plane components based on the traffic load by causing one or more processors having one or more cores to transition between a full power mode when the packet traffic load is above a predetermined threshold and a low power mode when the packet traffic load is below a predetermined threshold. Transitioning between different power modes makes it possible to optimize power consumption in the RAN user plane and/or among other elements associated with operating a communication network, which leads to reduced energy consumption, lower operational costs, reduced carbon emissions, and improved energy efficiency.

FIG. 1 is a diagram of a packet monitoring and power management system 100, in accordance with one or more embodiments. The packet monitoring and power management system 100 helps to reduce power consumption by the devices used to operate a communication network. In some embodiments, the packet monitoring and power management system 100 facilitates determining a packet rate and changing an operating state of a processor based on the packet rate.

The packet monitoring and power management system 100 comprises a packet monitoring and power management platform 101, a database 103, a network interface controller (NIC) device 105, one or more network devices 107, and one or more user equipment (UE) 109. The packet monitoring and power management platform 101, the database 103, the NIC device 105, the one or more network devices 107, and/or the one or more UE 109 are communicatively coupled by way of a communication network 111.

In some embodiments, the packet monitoring and power management platform 101 comprises a set of computer readable instructions that, when executed by a processor such as processor 703 (FIG. 7), causes the packet monitoring and power management platform 101 to perform the processes discussed in accordance with one or more embodiments. In some embodiments, the packet monitoring and power management platform 101 is remote from the NIC device 105 and the network device 107. In some embodiments, the packet monitoring and power management platform 101 is a part of one or more of the NIC device 105 or the network device 107. In some embodiments, one or more processes the packet monitoring and power management platform 101 is configured to perform is divided among one or more of the NIC device 105 or the network device 107 and a processor remote from the NIC device 105 and/or the network device 107. In some embodiments, the packet monitoring and power management platform 101 is at least partially implemented by a UE 109.

In some embodiments, the database 103 is a centralized network repository having searchable information stored therein that includes processor allocation information, processor physical core allocation information, logical core allocation information, operating state information, peripheral device (e.g, NIC device, network device, RAN device, or some other suitable device) information, rules defining thresholds for causing an operating state to be triggered, rules defining schedules for applying one or more rules for defining thresholds for causing an operating state to be triggered, rules defining operating state levels, or other suitable data associated with managing the utilization and power consumption of the network device 107 or other suitable components for operating the communication network 111. In some embodiments, database 103 is a memory such as memory 705 (FIG. 7) capable of being queried or caused to store data in accordance with one or more embodiments.

In some embodiments, NIC device 105 comprises circuitry that facilitates transmission of signals between the network and the packet monitoring and power management platform 101 and deliver data packets to the network device 107. In some embodiments, the NIC device 105 comprises at least one processor such as processor 703 or other suitable processor(s) and/or at least one memory such as memory 705 or at least one other suitable memory.

Network device 107 is equipment that enables connectivity over the wireless communication network. In some embodiments, network device 107 is a RAN device, an evolved node B (eNB) in fourth generation (4G), a fifth generation (5G) logical node (gNB), a network node, a new radio (NR) base station, a central unit (CU), a distributed unit (DU), a radio unit (RU), a device associated with operating a core network, or some other suitable network device having at least one processor. In some embodiments, the network device 107 comprises one or more processors such as processor 703 or other suitable processor(s) and/or at least one memory such as memory 705 or at least one other suitable memory.

UE 109 is a type of mobile terminal, fixed terminal, or portable terminal including a desktop computer, laptop computer, notebook computer, netbook computer, tablet computer, wearable circuitry, mobile handset, mobile phone, mobile device, pager, server, gaming console, gaming controller, virtual reality headset, augmented reality glasses, vehicle control unit, navigation device, internet-of-things (IoT) device, some other suitable computing device capable of connecting to communication network 111 and communicating data by way of communication network 111, or a combination thereof.

The NIC device 105 communicates data packets to the network device 107. The network device 107 comprises one or more processors that execute worker threads to process the data packets to facilitate communication of data between the UE 109 and other devices having connectivity to the communication network 111 such as other UE 109's, other network devices 107, An operating state of the one or more processors included in the network device 107 is capable of being in an active state or a sleep state. In some embodiments, the one or more processors included in the network device is capable of being in two or more sleep states. In some embodiments, one or more of the one or more processors included in the network device 107 comprises two or more physical cores, wherein each of the two or more physical cores is capable of being in an active state, a sleep state, a different sleep state compared to another physical core of a same or a different processor, or each physical core is capable of being in a same sleep state. In some embodiments, one or more of the one or more processors included in the network device 107 comprises two or more logical cores, wherein each of the two or more logical cores is capable of being in an active state, a sleep state, a different sleep state compared to another logical core of a same processor, or each logical core is capable of being in a same sleep state. In some embodiments, one or more physical cores comprise two of more logical cores, a processor has various combinations of physical cores and/or logical cores, etc. For simplicity, the present specification generally provides examples describing processor(s) and logical cores, but such examples should not be considered to be limiting in view of the numerous possible combinations of processors, single core processors, processors having multiple cores, processors having multiple logical cores, multiple physical core processors having one or more logical cores per physical core, etc. For example, in some embodiments, the operating state(s) discussed with respect to one or more processors and/or one or more logical cores is similarly applicable to managing the operating state of one or more physical cores.

In some embodiments, various operating states of one or more processors included in the network device 107 and/or one or more logical cores of the one or more processors are referred to herein as C-states. In some embodiments, a C0 state corresponds to the active state in which a processor and/or logical core consumes the most power compared to a different C-state. In some embodiments, the C-states include two states, the active state C0 and a sleep state C1 in which the processor and/or logical core consumes less power than the active state C0. In some embodiments, the C-states include the active state C0 and two or more different C-states C1 through Cn in which the processor is in a sleep state. In some embodiments, multiple C-states are associated with progressively deeper sleep states that coincide with correspondingly lower power consumption. While the different C-states could be as few as two states so that the processor is capable of being in an active state or a sleep state, some embodiments include several C-states progressing from the C0 state to a deepest sleep state Cn. In some embodiments, the deepest sleep state is a "C6" state or some other suitable C-state among a plurality of available C-states. For example, in such a configuration, the C-states would include C0, C1, C2, C3, C4, C5, C6 states. In some embodiments, the deepest C-state consumes the least power. In some embodiments, an amount of time to wake from a sleep state to the active state, or to wake from a sleep state to a less deep sleep state is based on how much of a change occurs when waking between the starting C-state and the target C-state. For example, in some embodiments, a direct jump from the C6 state to the C0 state would take more time than a jump from the C4 state to the C0 state or the C4 state to the C3 state. In some embodiments, the time to wake between each C-state to a next C-state is equal. For example, in some embodiments, the time to wake from the C1 state to the C0 state is equal to the time to change from the C2 state to the C1 state and from the C6 state to the C5 state. In some embodiments, the time to change between neighboring C-states varies based on processor utilization and processor details, configuration, etc. and the depth of the sleep state. For example, in some embodiments, although the C2 state is a deeper sleep state than the C1 state, the C2 state may be a state in which a processor or logical core is four times less active than the processor or logical core in the C1 state. As a result, the amount of time to change from the C2 state to the C1 state may be longer than the amount of time to wake from the C1 state to the active state C0.

The packet monitoring and power management platform 101 is configured to monitor a flow of data packets on a network plane. In some embodiments, the network plane is a user plane. In some embodiments, network plane is a RAN user plane, a centralized unit user plane (CU-UP), or distributed unit user plane (DU-UP), a user plane function (UPF), or some other suitable network plane. The packet monitoring and power management platform 101 is also configured to calculate a packet rate of the flow of the data packets, compare the packet rate with a first threshold value, and, in response to determining the packet rate is less than the first threshold value, cause an operating state of a processor included in the network device 107 to change from an active state to a sleep state. In some embodiments, the packet monitoring and power management platform 101 is configured to cause the operating state of multiple processors, multiple physical cores, and/or multiple logical cores of one or more processors of the network device 107 to be in the active state and/or a sleep state based on the packet rate.

In some embodiments, the packet monitoring and power management platform 101 compares the packet rate with a second threshold value higher than the first threshold value. Then, in response to determining the packet rate is greater than the second threshold value, the packet monitoring and power management platform 101 causes the operating state of the processor, multiple processors, multiple physical cores, and/or multiple logical cores of one or more processors of the network device 107 to change from the sleep state to the active state.

In some embodiments, the packet monitoring and power management platform 101 queries the database 103 to determine the first threshold and the second threshold to be applied based on various rules and information stored in database 103. In some embodiments, the first threshold value and the second threshold value are set based on logical core allocation information, operating state information, peripheral device (e.g., NIC device, network device, RAN device, etc.) information, time of day, projected network traffic, a network performance optimization algorithm that balances network performance and processing speeds with power consumption, a network performance optimization algorithm that prioritizes reduced power consumption over powering under-utilized system resources, available system resources, a quantity of UE 109's accessing the communication network 111 at a given time, a quantity of UE 109's within a predefined geographical area, a detected network device failure in the communication network 111 that is other than the network device 107, or some other suitable factor for setting the first threshold and the second threshold.

In some embodiments, the first threshold and the second threshold are fixed values according to the rule(s) in database 103. For example, in some embodiments, the first threshold value is 40% of a maximum packet rate, and the second threshold value is 60% of the maximum packet rate. In some embodiments, the first threshold value and the second threshold value are some other suitable percentage of the maximum packet rate. In some embodiments, the first threshold value and the second threshold value are a quantity of data packets in a data packet queue that are awaiting processing. In some embodiments, the first threshold value and the second threshold value are some other suitable quantifier associated with data packet quantity, flow, capacity, etc. In some embodiments, the first threshold value and the second threshold value are variable values based on the rules in database 103 and a combination of the one or more factors upon which the first threshold value and the second threshold value are capable of being set and real-time or projected data corresponding to such factors.

For example, if the first threshold value is 40% of the maximum packet rate, and the second threshold value is 60% of the maximum packet rate in a preset normal scenario for anticipated communication network usage within a predetermined area surrounding a football stadium Monday through Saturday, and the applied rule indicates that the quantity of UE 109's is projected to increase by 60,000 between the hours of 10 am and 6 pm on Sunday, then the first threshold value decreases to 30% and the second threshold value decreases to 40% so that the processor(s) of the network device are caused to remain in the active state longer while still providing an opportunity to reduce power consumption by going into the sleep state, but the rule also facilitates variance based on circumstance such as, if more UE 109's are accessing the communication network 111 within the predetermined area surrounding the football stadium than anticipated, the packet monitoring and power management platform 101 causes the first threshold value and the second threshold value to further decrease or to reduce a gap between the first threshold value and the second threshold value, and if fewer UE 109's are accessing the communication network within the predetermined area surrounding the football stadium than anticipated, the packet monitoring and power management platform 101 causes the first threshold value and the second threshold value to increase to the normal values for Monday through Saturday, or some place in between according to the rule and the factors which are applied. In some embodiments, varying the first threshold value and the second threshold value helps to balance the power savings achieved by causing one or more processors of network device 107 to be in a sleep mode with maximizing network performance according to circumstance. For example, if a processor is in a deep sleep state and communication network demand is high, lag time in the network that occurs when waking a processor from the deep sleep state may be reduced by limiting the instances when the processor goes into the deep sleep state and/or limiting how deep into two or more sleep states the processor is allowed to go based on one or more factors included in the various rules. In some embodiments, the packet monitoring and power management platform 101 is configured to cause the operating state of one or more processors, physical cores, and/or logical cores of the network device 107 to be in a deepest sleep state as often as possible according to the first threshold value and the second threshold value so that the greatest power consumption reduction can be achieved.

According to various embodiments, the packet monitoring and power management platform 101 makes it possible to reduce power consumption associated with operating network devices 107 of the communication network 111 compared to power consumption associated with operating the network devices 107 with processors, physical cores and/or logical cores that are in an always active state-which leads to reduced energy consumption, lower operational costs, reduced carbon emissions, and improved energy efficiency.

Figure 2:
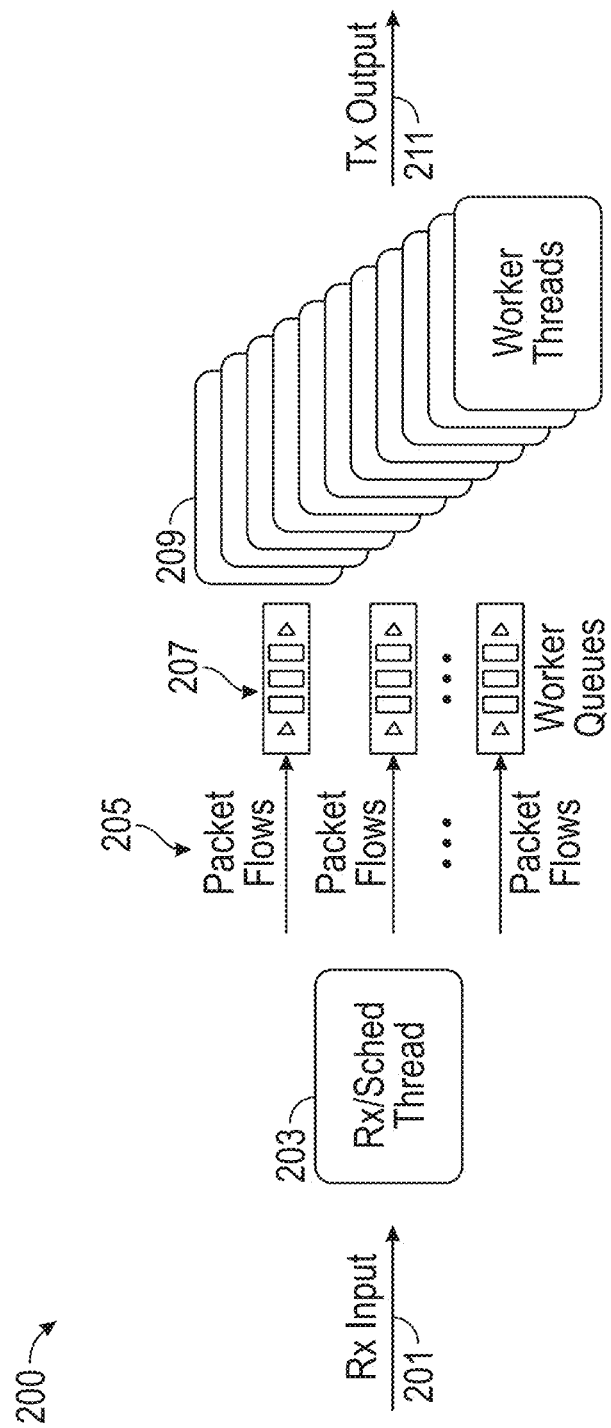
FIG. 2 is a data flow diagram in a radio access network user plane application, in accordance with one or more embodiments.

FIG. 2 is a data flow diagram in a radio access network user plane application 200, in accordance with one or more embodiments.

In some embodiments, the radio access network user plane application 200 hosts the packet data convergence protocol (PDCP) and the service data adaptation protocol (SDAP) of the gNB centralized unit (CU) for a next generation evolved node B (gNodeB). In some embodiments, the data flow diagram of FIG. 2 represents the design pipeline of the RAN user plane application which uses an event driven programming model.

In operation 201, a packet receiver/scheduler thread (Rx/Sched) receives data packets from an input interface such as NIC device 105 (FIG. 1). In some embodiments, the Rx/Sched thread is executed by the packet monitoring and power management platform 101 (FIG. 1). In some embodiments, the packet receiver thread (Rx thread) is a separate thread from the scheduler thread (Shed thread) such that the Rx thread and the Sched thread are executed by different processors, or different physical cores and/or logical cores of a same processor. In some embodiments, each of the Rx thread and the Sched thread are executed by the packet monitoring and power management platform 101.

In operation 203, Rx/Sched thread selects and schedules a packet flow for a worker thread. In some embodiments, Sched thread schedules a unique packet flow for at most one worker thread at a time to ensure in-order processing of the data packets.

In operation 205, Rx/Sched thread sends the scheduled packet flow(s) to the worker threads. In some embodiments, the Rx/Sched thread sends the scheduled packet flow(s) based on a flow identifier (ID). In some embodiments, the flow ID is a general packet radio service (GPRS) tunnel ID (GTP Tunnel Id).

In operation 207, the data packets sent to the worker threads according to the scheduled packet flow(s) are added to a worker queue to await processing by the worker threads. In some embodiments, the worker queues are atomic lockless worker queues. In some embodiments, the worker queues are in a cache memory of a network device such as a network device 107 (FIG. 1).

In operation 209, the worker threads dequeue the data packets and process the data packets. In some embodiments, the worker threads are executed by one or more of the processors included in the network device 107. In some embodiments, the worker threads are allocated to be executed by various combinations of processor(s), physical core(s) of the processor(s), and/or logical core(s) of the processor(s) and/or physical core(s) of the processor(s).

In operation 211, the worker threads output the processed data packets by way of a transmission interface Tx Output for reception by a downstream UE, network device, core network, or other suitable recipient having connectivity to the communication network, network device, etc. for operating the communication network.

In some embodiments, the RAN user plane application 200 uses an event driven programming model, which offers application to scale by utilizing one or more of multicore scaling, dynamic load balancing, pipelining, packet ingress order maintenance, synchronization services, or some other suitable strategy.

In some embodiments, Rx/Sched thread receives data packets and distributes the packet flows to worker queues of available worker threads for processing, wherein the availability of the worker thread is based on the operating state of the worker thread, the processor allocated to execute the worker thread, the physical core of the processor allocated to execute the worker thread, and/or the logical core of the processor allocated to execute the working thread. In some embodiments, the Rx/Sched thread continues to direct packet flows to a same worker queue so long as the worker thread is actively processing data packets and/or the worker queue has data packets awaiting processing by the worker thread from a previous or currently scheduled packet flow.

In some embodiments, a processor, such as a processor 703 (FIG. 7), that executes the Rx/Sched thread is constantly in the C0 active state, because the Rx/Sched thread is in a constantly polling busy loop in which instructions are continuously executed.

In the RAN user plane application 200, as operations 201-211 progress, the Rx/Sched thread monitors one or more flows of the data packets (ingress and/or outgress), and/or one or more of the packet rate of the flow(s) of the data packets, the quantity of data packets in the worker queues, the operating state(s) of the processor(s) executing the worker threads, or the operating state(s) of the physical core(s) and/or the logical core(s) executing the worker threads, and causes the operating state of one or more of the processor(s) allocated to execute one or more worker threads, the physical core(s) allocated to execute one or more worker threads, and/or the operating states of the logical core(s) allocated to execute one or more worker threads to change based on one or more of the packet rate of the flows of the data packets, the quantity of data packets in the worker queues in accordance with one or more rules in a database such as database 103 (FIG. 1).

In some embodiments, for example, while the processor executing Rx/Sched thread remains in a high-power consumption active state C0, in response to the packet rate of the ingress flow of the data packets being below a threshold value, the Rx/Sched thread causes the one or more processors and/or one or more logical cores of the one or more processors allocated to execute one or more worker threads to change to an operating state identified in the rule corresponding to the determined packet rate so as to reduce power compared to a current operating state of the one or more processors and/or one or more logical cores.

For example, in some embodiments, a core voltage (Vcc) of a processor is high in the active C0 state. Thus, higher power is consumed in the "C0" state compared to a different C-state Cn in which the processor is in a sleep state. In some embodiments, multiple C-states are associated with progressively deeper sleep states that coincide with correspondingly lower power consumption. While the different C-states could be as few as two states in some embodiments so that the processor is capable of being in an active state or a sleep state, some embodiments include several C-states progressing from the C0 state to a deepest sleep state Cn. In some embodiments, the deepest sleep state is a "C6" state or some other suitable C-state among a plurality of available C-states. For example, in such a configuration, the C-stated would include C0, C1, C2, C3, C4, C5, C6 states. In some embodiments, in the deepest C-state, core voltage (Vcc) is as low as possible, resulting in the greatest reduction in power consumption. In some embodiments, Rx/Sched thread is configured to maximize an amount of time a processor, physical core and/or logical core is caused to be in the deepest sleep state available to maximize power consumption reduction while monitoring the flow of the data packets to cause the processor, physical core and/or logical core that is in the deepest sleep state to return to the active state C0 on-demand based on the packet rate.

In some embodiments, all of the worker threads are initially available for processing data packets upon startup. In some embodiments, a preset quantity of the worker threads fewer than all of the worker threads is initially available for processing data packets upon startup. In some embodiments, a quantity of the worker threads that are other than the preset quantity of worker threads initially available at startup are in one of the sleep C-states to minimize power consumption of the network device 107 until a wake-up threshold is reached corresponding to the processor(s), physical core(s) and/or the logical core(s) allocated to executing those worker threads that are initially unavailable at startup.

In some embodiments, the Rx/Sched thread determines a worker thread is unavailable based on the operating state of the processor, physical core and/or the logical core of the processor allocated to executing a particular worker thread and/or based on a capacity of the worker queue being full. For example, if a level-1 (L1) cache and/or a level-2 (L2) cache of the processor allocated to executing the worker thread is full, the worker thread may be determined to be unavailable if the packet rate is greater than the speed at which the worker queue is being flushed by way of processing the data packets. In some embodiments, so long as the processor, physical core and/or logical core allocated to execute the worker thread is in the active state C0, the worker thread is available for scheduling the packet flow.

In some embodiments, the processor, physical core and/or logical core allocated to executing the worker thread is in a sleep state Cn that is other than a deepest sleep state wherein the processor, physical core and/or logical core is at least partially active and available for processing data packets, albeit at a reduced speed to facilitate reduced power consumption compared to the fully active state C0. In some embodiments, in response to the Rx/Sched thread determining that a worker thread is unavailable based on the packet rate being greater than the processing speed of the worker thread and the worker queue corresponding to the worker thread is full or near capacity such that the packet rate would result in the worker queue being full, and/or determining that the packet rate is greater than a wake-up threshold, the Rx/Sched thread causes one or more worker threads to be made available by causing the operating state of the processor(s), physical core(s) and/or the logical core(s) of the processor(s) allocated to executing the worker thread(s) that are to be made available to change from a sleep state, whether that be the deepest sleep C-state Cn to the fully active state C0 or a partially active sleep state that is between the fully active state C0 and the deepest sleep state Cn. In some embodiments, a partially active sleep state is a C-state between the C0 state and the deepest sleep state Cn in which the worker threads are not available because the processor, physical core or logical core allocated to executing the working thread is in a reduced power state for memory retention and/or to facilitate a faster wake-up time for returning to the active state C0 wherein the worker threads are available to process data packets.

In some embodiments, the Rx/Sched thread causes the operating state of the processor(s), physical core(s) and/or the logical core(s) allocated to executing one or more of the worker threads to adaptively adjust the operating state of the processor(s), physical core(s) and/or logical core(s) based on system demand according to the packet rate, thereby making some worker threads unavailable for scheduling packet flows.

For example, in response to determining the packet inflow rate is less than a first threshold value, the Rx/Sched thread causes the operating state of one or more of the processor(s), physical core(s) or the logical core(s) allocated to executing one or more worker threads to change from a fully active state C0 or a partially active sleep state to a sleep state that is a lesser active C-state than the C0 state, a sleep state that is wholly inactive but consume more power than a deepest sleep state Cn, or a deepest sleep state Cn that is wholly inactive and consumes the least amount of power possible, such that some of the worker threads are made unavailable or at least flagged as being in a slower processing state. The Rx/Sched thread then schedules the packet flow(s) for sending to the available worker threads and/or optimizes the direction of the scheduled packet flow(s) to prioritize the available worker threads that are to be executed by a fully active processor, physical core or logical core in the C0 state while scheduling packet flows to available worker threads that are to be executed by a partially active processor, physical core or logical core in a sleep state that is between the fully active state C0 and the deepest sleep state Cn. Then, in accordance with the rule(s) for waking one or more of the processor(s), physical core(s) or logical core(s) to make more worker threads available or to increase the processing speeds of some worker threads, the Rx/Sched thread causes the operating state of one or more processors, physical core or logical cores allocated to the worker threads the change from a current sleep state to the fully active state C0 or a partially active sleep state between the fully active state C0 and the deepest sleep state Cn in response to a wake-up threshold value for the packet rate being breached.

In some embodiments, Rx/Sched thread identifies, based on the rules in database 103, a group of worker threads as candidate worker threads that are capable of being made unavailable and/or capable being executed at a slower speed, and causes the operating state of the processor(s), physical core(s) or logical core(s) allocated to executing the candidate worker threads to be in a sleep state, a deeper sleep state from a partially active sleep state, a fully inactive deeper sleep state, or the fully inactive deepest sleep state to achieve the greatest reduction in power consumption without communication network service interruption or any degradation or interruption of data packet processing of the incoming data packet traffic. In some embodiments, the candidate worker threads are identified based on a balancing of the greatest reduction in power consumption with minimizing identifiable risk of communication network service interruption, degradation or interruption of data packet processing of the incoming data packet traffic, or minimizing expected degradation or interruption of data packet processing of the incoming data packet traffic in accordance with the rules in the database 103.

In some embodiments, all of the worker threads are candidate worker threads at all times to facilitate achieving maximum reduction in power consumption. In some embodiments, only the group of worker threads identified as candidate worker threads, wherein the quantity of candidate worker threads is less than the total quantity of worker threads, are capable of being of being made unavailable and/or capable being executed at a slower speed by causing the operating state of the processor(s), physical core(s) and/or the logical core(s) allocated to executing the candidate worker threads to change to a sleep state, a deeper sleep state or the deepest sleep state so that at least a minimum quantity of worker threads remains available to process data packets so as to meet a minimum expected network performance or to keep up with projected demand on the communication network in accordance with the rules in database 103.

In some embodiments, the candidate worker threads are identified based on processor architecture to achieve the greatest reduction in power possible. In some embodiments, in response to the packet rate being below a threshold value for causing the processor(s), physical core(s) and/or the logical core(s) to be in a sleep state, a deeper sleep state, or a deepest sleep state, the Rx/Sched thread migrates all the packet flows that are scheduled and/or in the process of being sent to the candidate worker threads from the candidate worker threads to the remaining available worker threads so as to reduce the data packet flow to the candidate worker threads to zero.

Figure 3:
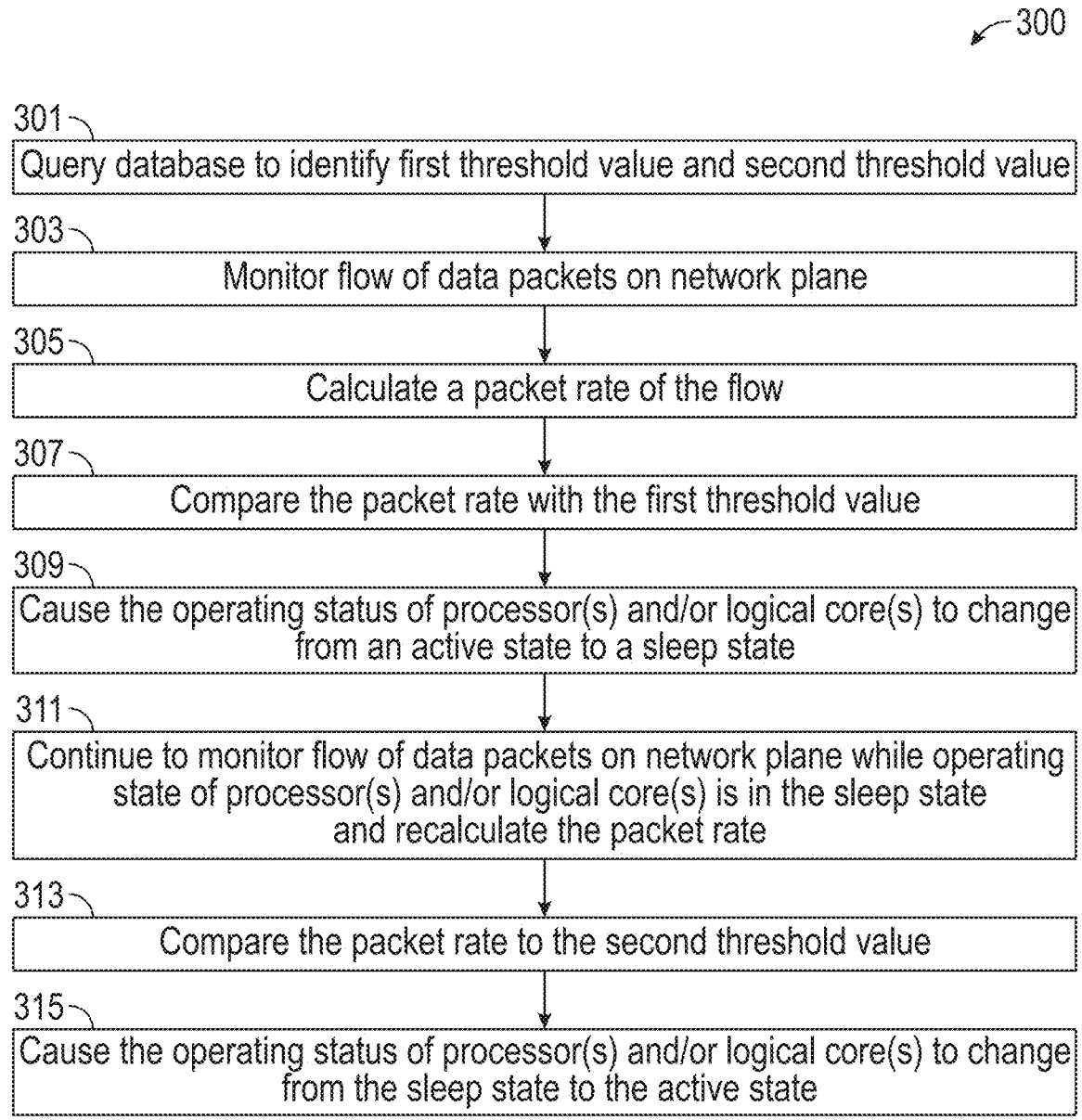
FIG. 3 is a flow chart of a process of determining a packet rate and changing the operating state of a processor, in accordance with one or more embodiments.

FIG. 3 is a flow chart of a process 300 of determining a packet rate and changing the operating state of a processor, in accordance with one or more embodiments. In some embodiments, packet monitoring and power management platform 101 (FIG. 1) performs the process 300.

In step 301, a database such as database 103 (FIG. 1) is queried to identify a first threshold value and a second threshold value to be used as packet inflow load markers. In some embodiments, the first threshold value is a low water mark (Lwm) and the second threshold value is a high water mark (Hwm). In some embodiments, first threshold value is 40% of a maximum packet rate, and the second threshold value is 60% of the maximum packet rate. In some embodiments, the first threshold value is some other suitable percentage of the maximum packet rate and the second threshold value is some other suitable percentage of the maximum packet rate greater than the first threshold value.

In some embodiments, the first threshold value and the second threshold value are based on a percentage of the maximum packet rate, some other suitable quantifier of the packet rate, a free capacity of one or more worker thread queues, a quantity of fully available and/or partially available worker threads, a quantity of processors, physical cores and/or logical cores that are in a fully active state, a sleep state, a deepest sleep state, or a partially active sleep state, situational circumstance identified in accordance with one or more rules in the database, a projected communication network demand, a quantity of UE's accessing or projected to access the communication network, a geographical area, a time of day, a schedule, some other suitable factor, or a combination thereof.

In some embodiments, the first threshold value and the second threshold value are fixed according in accordance with a rule in the database. In some embodiments, one or more of the first threshold value or the second threshold value is variable in accordance with factors identified an applicable rule in the database. In some embodiments, step 301 is continuously performed in parallel with one or more other steps of the process 300 to facilitate continuously updating the first threshold value and/or the second threshold value to meet communication network demand or projected communication network demand while minimizing power consumption.

In step 303, a flow of data packets on a network plane are monitored.

In step 305, a packet rate (PktRate) of the flow of the data packets is calculated.

In some embodiments, the network plane is a user plane. In some embodiments, network plane is a RAN user plane, a centralized unit user plane (CU-UP), or distributed unit user plane (DU-UP), a user plane function (UPF), or some other suitable network plane.

In step 307, the packet rate is compared to the first threshold value.

In step 309, in response to determining the packet rate is less than the first threshold value, an operating state of one or more processors communicatively coupled with the packet monitoring and power management platform 101 is caused to change from an active state to a sleep state. In some embodiments, in response to determining the packet rate is less than the first threshold value, an operating state of at least one of plurality of physical cores allocated to executing data packet processing worker threads are caused to change from an active state to a sleep state. In some embodiments, in response to determining the packet rate is less than the first threshold value, an operating state of at least one of plurality of logical cores allocated to executing data packet processing worker threads are caused to change from an active state to a sleep state. In some embodiments, the operating state of the one or more processors is caused to change from the active state to the sleep state by changing the operating state of at least one logical core of a corresponding processor or physical core of the corresponding processor to change from the active state to the sleep state.

In some embodiments, the sleep state is one of two or more sleep states that include progressively deeper sleep states. In some embodiments, a first sleep state results in reduced power consumption compared to the active state, a second sleep state is a deeper sleep state compared to the first sleep state and results in reduced power consumption compared to the first sleep state, etc. In some embodiments, the processor(s), physical core(s) and/or the logical core(s) are fully inactive in the sleep state. In some embodiments, the processor(s), (physical core(s) and/or the logical core(s) are partially inactive in the sleep state. In some embodiments, the sleep state is one of two sleep states wherein all the processor(s), (physical core(s) and/or the logical core(s) are fully inactive for purposes of executing worker threads, and the depth of the sleep state varies to facilitate some operability or maintaining of cache memory, while minimizing power consumption, and minimizing a wake time from a current sleep state to the active state, wherein the wake time is based on the depth of the sleep state and the jump from the current sleep state to the active state. In some embodiments, a deepest sleep state among two or more sleep states is fully inactive or fully inactive for purposes of executing worker threads, while one or more other sleep states remain at least partially active for purposes of executing worker threads and/or to facilitate some operability or maintaining of cache memory.

In step 311, the flow of the data packets on network plane is continued to be monitored while operating state of the one or more processors, one or more physical cores and/or the at least one logical core of the corresponding processor(s) and/or physical core(s) is in the sleep state, and the packet rate is recalculated. In some embodiments, the flow of the data packets is continuously monitored. In some embodiments, the flow of the data packets is continued to be monitored based on a predefined schedule in accordance with the rule(s) in the database. In some embodiments, the flow of the data packets is continued to be monitored based on a triggering of an event defined by the rule(s) in the database. In some embodiments, the packet rate is recalculated continuously with the continued monitoring of the flow of the data packets. In some embodiments, the packet rate is recalculated based on a predefined schedule in accordance with the rule(s) in the database. In some embodiments, the packet rate is recalculated based on a triggering of an event defined the rule(s) in the database. In some embodiments, the recalculating of the packet rate helps to avoid one or more of inadvertent interruption of the communication network service, inadvertent interruption of the processing and/or transmission of the data packets, inadvertent overconsumption of power, or inadvertent slow processing of the data packets when the processor(s), physical core(s) and/or logical core(s) are in the active state or a sleep state contrary to a packet rate which would otherwise warrant the processor(s), physical core(s) and/or logical core(s) being in the other of the active state or the sleep state, for example.

In step 313, the packet rate (PktRate) of the flow of data packets is compared to the second threshold value.

In step 315, in response to determining the packet rate is greater than the second threshold value, cause the operating state of the second processor to change from the sleep state to the active state. In some embodiments, returning the processor(s), physical core(s) and/or the logical core(s) to the active state facilitates increasing the processing capabilities of the network device to meet the communication network demand and/or to meet the projected demand. Although in the active state, power consumption is increased compared to a time when the processor(s), physical core(s) and/or the logical core(s) are in the sleep state, power consumption is reduced for the overall operation of the communication network, because power consumption is reduced compared to a time wherein all of the processor(s), physical core(s) and/or the logical core(s) are in the active state.

In some embodiments, the ordered combination of steps of process 300 is repeated to adaptively control the operating state of the processor(s), physical core(s) and/or logical core(s) of the network device(s) to minimize power consumption while adapting to keep up with communication network demand and/or meet projected demand. In some embodiments, the repetition of step 301 facilitates updating the first threshold value and/or the second threshold value in accordance with the rule(s) in the database based on the communication network demand and/or the projected communication network demand for each cycle of process 300.

According to various embodiments, process 300 makes it possible to transition a processor between full power mode and low power mode which, in turn, makes it possible to reduce power consumption associated with operating a communication network. In some embodiments, process 300 helps to improve energy efficiency of RAN user plane applications in a communication network.

Figure 4:
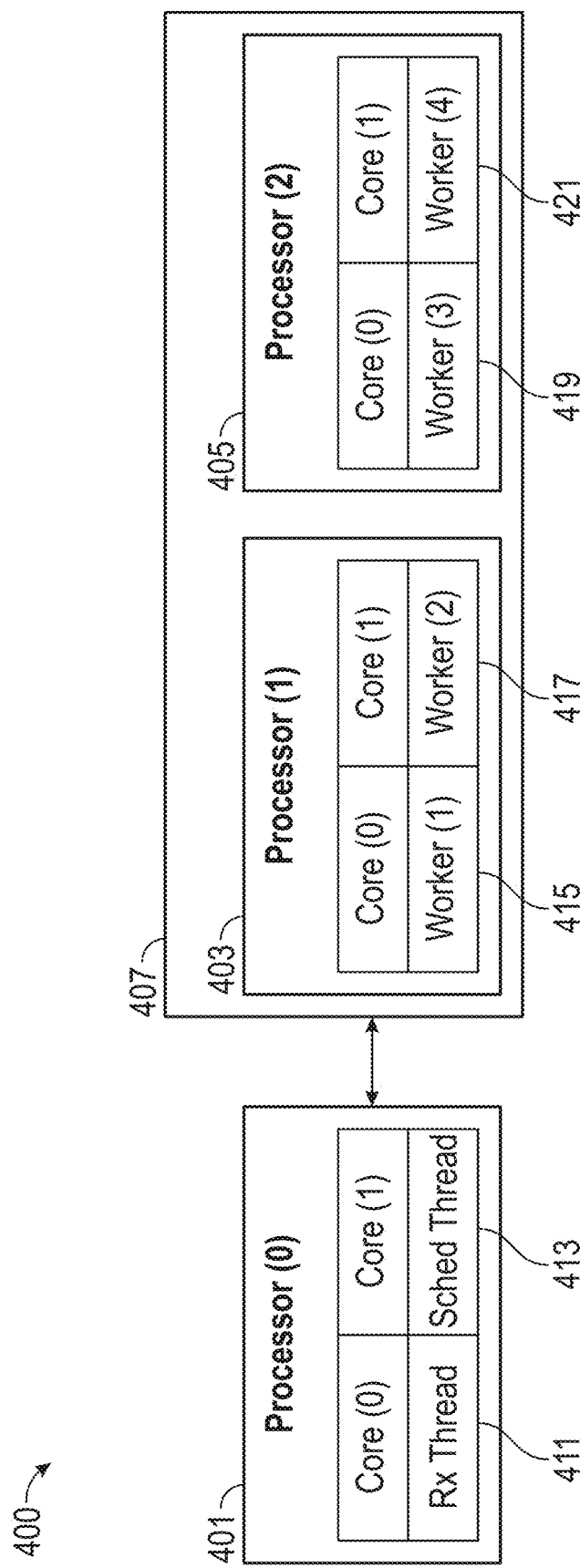
FIG. 4 is a diagram of a processor/core allocation, in accordance with one or more embodiments.

FIG. 4 is a diagram of a processor/core allocation 400, in accordance with one or more embodiments.

Figure 7:
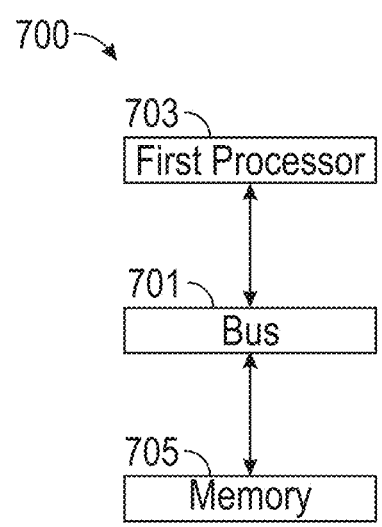
FIG. 7 is a functional block diagram of a computer or processor-based system upon which or by which an embodiment is implemented.

In some embodiments, processor/core allocation 400 demonstrates a division of threads to be executed for processing incoming data packets received by way of a communication network. In some embodiments, a first processor 401 is usable to execute the packet monitoring and power management platform 101 (FIG. 1). A second processor 403 and a third processor 405 are included in a network device 407. Network device 407 is usable as network device 107 (FIG. 1). In some embodiments, network device 407 includes the first processor 401 and the packet monitoring and power management platform 101 is executed by a component of the network device 407. In some embodiments, one or more of first processor 401, second processor 403 or third processor 403 is a processor such as processor 703 (FIG. 7). In some embodiments first processor 401, second processor 403 and third processor 403 are separate processors. In some embodiments, first processor 401, second processor 403 or third processor 403 are separate physical cores of a single processor. In some embodiments, second processor 403 and third processor 403 are separate physical cores of a single processor and first processor 401 is a separate processor from a processor including the second processor 403 and the third processor 403 as separate physical cores.

In some embodiments, the first processor 401 includes at least two logical cores, first logical core (0) and second logical core (1). The first logical core (0) of the first processor 401 is allocated to execute a receiver (Rx) thread 411 and a scheduler (Sched) thread 413.

In some embodiments, the second processor 403 and the third processor 405 comprise corresponding first logical cores (0) and second logical cores (1). The first logical core (0) of the second processor 403 is allocated to execute a first worker thread 415, the second logical core (1) of the second processor 403 is allocated to execute a second worker thread 417. The first logical core (0) of the third processor 405 is allocated to execute a third worker thread 419, and the second logical core (1) of the third processor 405 is allocated to execute a fourth worker thread 421.

According to various embodiments, allocating a pair of packet processing worker threads to separate logical cores that share a same processor or physical core (e.g., second processor 403 or third processor 405) makes it possible to control power consumption by separately controlling the operating state of each logical core included in a corresponding processor. In some embodiments, to achieve a maximum reduction in power consumption for a single processor or physical core, the operating state of both logical cores included in the single processor are caused to be in a deepest sleep state in response to the packet rate being below the first threshold value, for example. Similarly, in some embodiments, to achieve a maximum reduction in power consumption for a single processor having multiple physical cores, the physical cores included in the single processor are caused to be in a deepest sleep state in response to the packet rate being below the first threshold value, for example.

In some embodiments, the network device 407 comprises one or more additional processors, each having one or more physical cores and/or one or more logical cores having an operating state that is capable of being individually controlled by the packet monitoring and power management platform 101 to minimize power consumption by the network device 407. In some embodiments, one of more of the second processor 403, the third processor 405, or any additional processor(s) included in network device 407 comprises a plurality of physical and/or logical cores having an operating state that is capable of being individually controlled by the packet monitoring and power management platform 101 to minimize power consumption by the network device 407.

Figure 5:
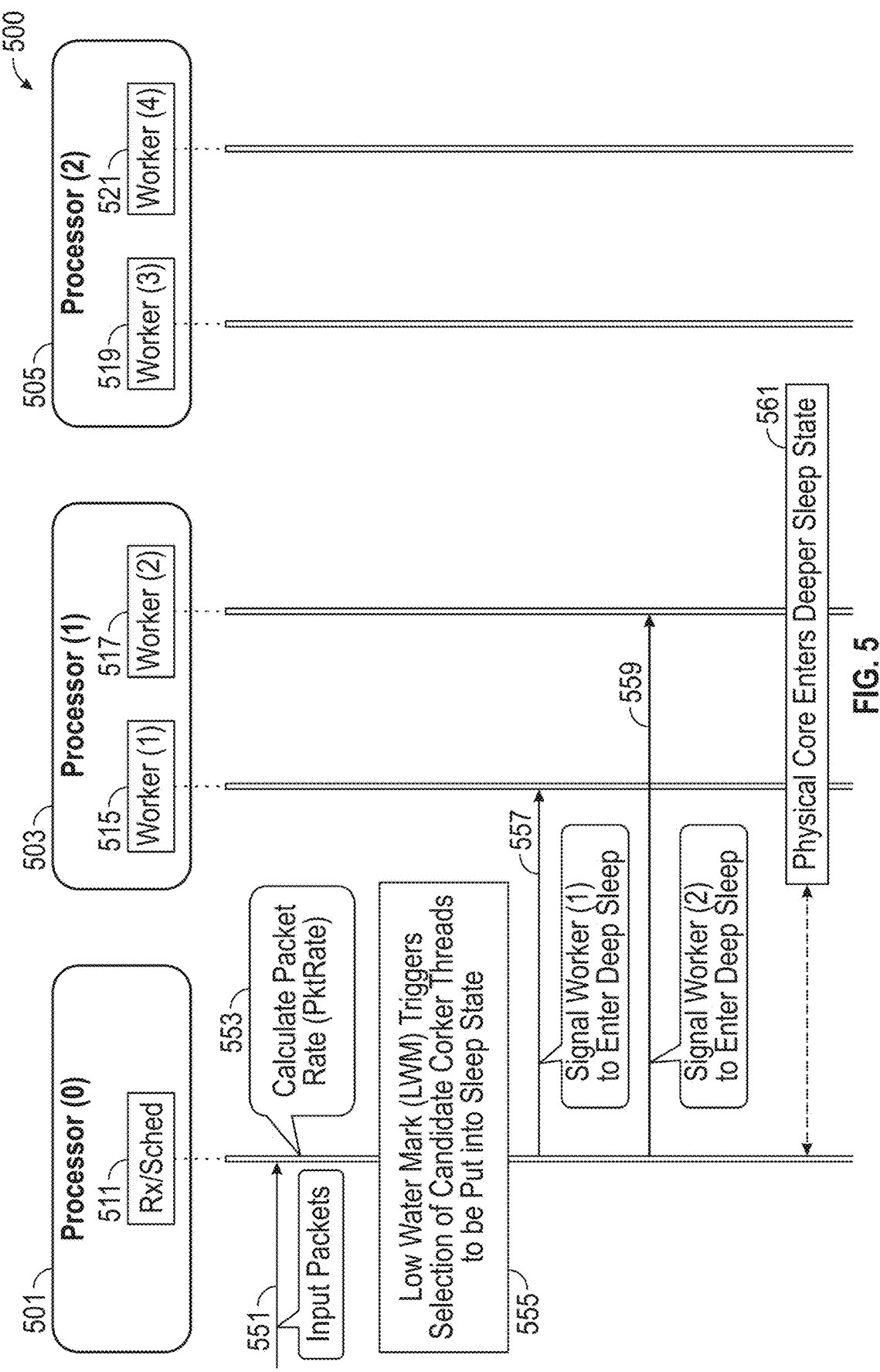
FIG. 5 is a process flow diagram of a process of determining a packet rate and causing an operating state of a processor to change from an active state to a sleep state, in accordance with one or more embodiments.

FIG. 5 is a process flow diagram of a process 500 of determining a packet rate and causing an operating state of a processor to change from an active state to a sleep state, in accordance with one or more embodiments.

In some embodiments, the process 500 is executed by a first processor 501. In some embodiments, the first processor 501 is usable to execute the packet monitoring and power management platform 101 (FIG. 1) to perform the operations included in the process 500. The operations included in the process 500 are discussed with respect to a second processor 503 and a third processor 505. The second processor 503 and the third processor 505 are similar to the second processor 403 (FIG. 4) and the third processor 405 (FIG. 5), with the reference numerals increased by 100.

In operation 551, a Rx/Sched thread 511 that is allocated to a logical core of the first processor 501 monitors an input flow of data packets that are received by way of a NIC controller (e.g., NIC device 105 discussed with respect to FIG. 1), or some other suitable input interface.

In operation 553, the Rx/Sched 511 calculates the packet rate (PktRate) of the flow of the data packets.

In operation 555, the Rx/Sched thread 511 compares the packet rate of the flow of the data packets to a first threshold value that is a low water mark (Lwm) and, in response to determining the packet rate (PktRate) is below the first threshold value, the Rx/Sched thread 511 identifies which worker threads of worker threads 515, 517, 519 and 521 are capable of being candidate worker threads. In this example, the Rx/Sched thread 511 selects the identified candidate worker threads 515 and 517 as target worker threads that are to be put into a sleep state. Based on the determination to put the worker threads 515 and 517 into the sleep state, the Rx/Sched thread 511 modifies the schedule of the data packet flow to omit sending newly received data packets to worker thread 515 and worker thread 517 while continuing to send received data packets to worker thread 519 and worker thread 521 executed by third processor 505.

In some embodiments, after omitting worker thread 515 and worker thread 521 from the data packet flow schedule, worker thread 515 and worker thread 517 continue to process data packets that are in each worker queue corresponding to worker thread 515 and worker thread 517 until the worker queues are empty.

In this example embodiment, in response to the worker queues of worker thread 515 and worker thread 517 being empty, with the operating state of the third processor 505 being in the fully active state and the packet rate PktRate being less than the first threshold value, the Rx/Sched thread 511 determines that the worker thread 515 and 517 need not be executed, and determines that the first logical core of the second processor 503 allocated to execute worker thread 515 and the second logical core of the second processor 503 allocated to execute worker thread 517 are to be put into a deep sleep state. In some embodiments, the Rx/Sched thread 511 causes the operating state of the second processor 503 to be in a sleep state when the Rx/Sched thread 511 omits worker thread 515 and/or worker thread 517 from the schedule for receiving data packets and, in response to determining the worker queue of worker thread 515 and the worker queue of worker thread 517 is fully drained of all to-be-processed data packets, the Rx/Sched thread 511 causes the operating state of the second processor 503 to change to a deeper sleep state compared to the initial sleep state.

In operation 557, the Rx/Sched thread 511 sends a signal to the second processor 503 to cause the operating state of the first logical core of the second processor 503 allocated to execute worker thread 515 to change from the active state to a deep sleep state.

In some embodiments, based on the determination to put the worker thread 515 into the sleep state, the Rx/Sched thread 511 modifies the schedule of the data packet flow to omit sending newly received data packets to worker thread 515 and immediately proceeds to operations 557 to cause the first logical core of the second processor 503 allocated to execute worker thread 515 to change from the active state to a deep sleep state, as an all-stop so that the worker thread 515 is put into the sleep state and stops processing any packets that are in the worker queue corresponding to worker thread 515.

In operation 559, the Rx/Sched thread 511 sends a signal to the second processor 503 to cause the operating state of the second logical core of the second processor 503 allocated to execute the worker thread 517 to change from the active state to the deep sleep state.

In some embodiments, based on the determination to put the worker thread 517 into the sleep state, the Rx/Sched thread 511 modifies the schedule of the data packet flow to omit sending newly received data packets to worker thread 517 and immediately proceeds to operation 559 to cause the second logical core of the second processor 503 allocated to execute worker thread 517 to change from the active state to a deep sleep state, as an all-stop so that the worker thread 517 is put into the sleep state and stops processing any packets that are in the worker queue corresponding to worker thread 517.

In operation 561, based on the operating states of both of the first logical core and the second logical core of the second processor 503 being in the deep sleep state, the operating state of the physical core of the second processor 503 is caused to change from the active state to a deeper sleep state than if one of the logical cores, for example, remained in the active state with the other of the logical cores being in a sleep state.

In some embodiments, Rx/Sched thread 511 sends a signal to the second processor 503 to cause the operating state of the physical core of the second processor 503 to change from the active state to a deeper sleep state in response to the operating states of both of the first logical core and the second logical core of the second processor 503 being in the deep sleep state.

In some embodiments, the second processor 503 sends a request to the first processor 501 to seek permission to enter a deeper or deepest sleep state in response to detecting the first logical core of the second processor 503 allocated to execute worker thread 515 and the second logical core of the second processor 503 allocated to execute worker thread 517 are in a deep sleep state. Rx/Sched thread 511 then sends a signal to the second processor 503 to cause the operating state of the physical core of the second processor 503 to change from the active state to a deeper sleep state in response to the request from the second processor 503 to enter the deep sleep state. In some embodiments, the Rx/Sched thread 511 processes real-time data associated with current communication network demand and/or projected communication network demand to determine whether to send the signal to the second processor 503 to cause the operating state of the physical core of the second processor 503 to change from the active state to a deeper sleep state.

In some embodiments, the second processor 503 autonomously enters a deeper or deepest sleep state in response to detecting the first logical core of the second processor 503 allocated to execute worker thread 515 and the second logical core of the second processor 503 allocated to execute worker thread 517 are in a deep sleep state.

In some embodiments, the operating state of only one of the first logical core allocated to execute worker thread 515 or the second logical core allocated to execute worker thread 517 is caused to change to from the active state to a sleep state in response to determining the packet rate (PktRate) is below the first threshold value.

In some embodiments, with the packet rate PktRate being below the first threshold value, and the second processor 503 being in a sleep state, power consumption is reduced compared to an operating state wherein both the second processor 503 and the third processor 505 are in the active state. In this example, to facilitate operation of the communication network. Rx/Sched thread 511 keeps the operating state of the third processor 505 in the active state. In some embodiments, in response to the first processor being in the sleep state to reduce power consumption, the operating state of at least one of the first logical core of the third processor 505 allocated to execute worker thread 519 or the second logical core of the third processor 505 allocated to execute worker thread 521 is changed from the active state to a peak utilization state in response to determining the packet rate PktRate is greater than the first threshold value and less than a second threshold value that is a high water mark (Hwm) that is greater than the first threshold value. In some embodiments, at least one of worker thread 519 or worker thread 519 in the peak utilization state processes the data packets at a speed that is faster than the at least one of worker thread 519 or worker thread 521 processes the data packets in the active state. In some embodiments, the peak utilization state is an overclocking percentage of the third processor 505, for example, that is activated to facilitate the faster processing of the data packets. In some embodiments, overclocking the third processor 505 makes it possible to have a higher low water mark for triggering the transition of the second processor 503 to the sleep state while meeting communication network demand by increasing the processing capabilities of the third processor 505 which, overall, would consume less power than having the second processor 503 and the third processor 505 in the active state and/or having the second processor 503 in a partially active state with the third processor in the active state.

Figure 6:
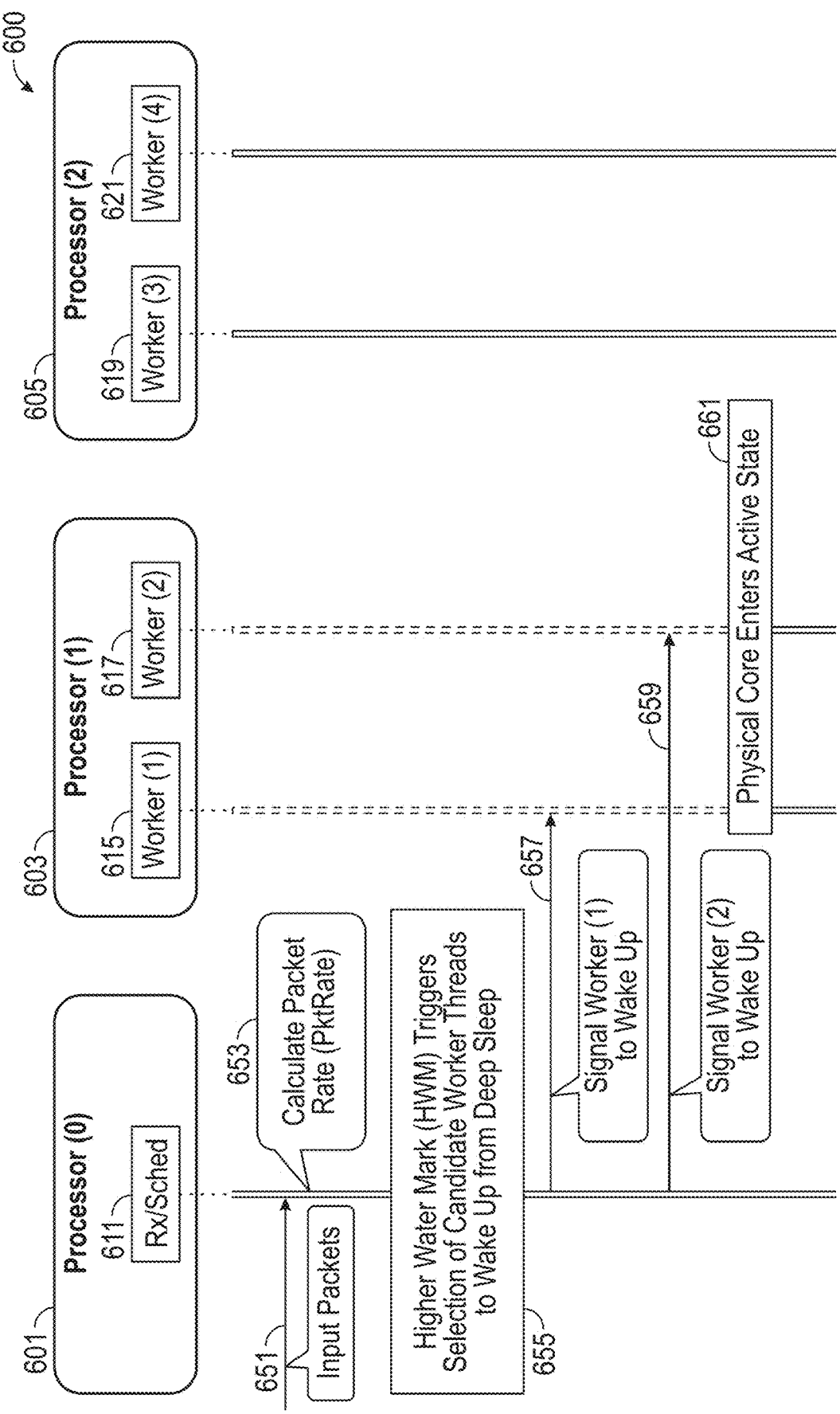
FIG. 6 is a process flow diagram of a process of determining a packet rate and causing an operating state of a processor to change from a sleep state to an active state, in accordance with one or more embodiments.

FIG. 6 is a process flow diagram of a process 600 of determining a packet rate and causing an operating state of a processor to change from a sleep state to an active state, in accordance with one or more embodiments.

In some embodiments, the process 600 is executed by a first processor 601. In some embodiments, the first processor 601 is usable to execute the packet monitoring and power management platform 101 (FIG. 1) to perform the operations included in the process 600. The operations included in the process 600 are discussed with respect to a second processor 603 and a third processor 605. The second processor 603 and the third processor 605 are similar to the second processor 403 (FIG. 4) and the third processor 405 (FIG. 5), with the reference numerals increased by 200. In some embodiments, process 600 is an example of a subsequent process to process 500 (FIG. 5), with the reference numerals for first processor 501, second processor 503, and third processor 505 increased by 100. In some embodiments, process 600 is a stand-alone process from process 500.

In operation 651, a Rx/Sched thread 611 that is allocated to a logical core of first processor 601 monitors an input flow of data packets that are received by NIC controller (e.g., NIC device 105 discussed with respect to FIG. 1), or some other suitable input interface.

In operation 653, the Rx/Sched thread 611 calculates the packet rate (PktRate) of the flow of the data packets.

In operation 655, the Rx/Sched thread 611 compares the packet rate of the flow of the data packets to a second threshold value that is a high water mark (Hwm) and, in response to determining the packet rate (PktRate) is above, the second threshold value, the Rx/Sched thread 611 identifies which worker threads of worker threads 615, 617, 619 and 621 are capable of being candidate worker threads to wake from a deep sleep operating state. In this example, worker threads 615 and 617 are initially in the deep sleep operating state, and worker threads 619 and 621 are in an active state. The Rx/Sched thread 611 then identifies worker threads 615 and 617 as target worker threads to wake from the deep sleep operating state.

In operation 657, the Rx/Sched thread 611 sends a signal to the second processor 603 to cause the operating state of the first logical core of the second processor 603 allocated to execute worker thread 615 to change from the deep sleep state to the active state.

In operation 659, the Rx/Sched thread 611 sends a signal to the second processor 603 to cause the operating state of the second logical core of the second processor 603 allocated to execute the worker thread 617 to change from the deep sleep state to the active state.

In operation 661, based on the operating states of both of the first logical core and the second logical core of the second processor 603 being in the active state, the operating state of the physical core of the second processor 603 is caused to change from a deep sleep state to the active state. In some embodiments, one or more of worker thread 615 or worker thread 617 sends a message to the Rx/Sched thread 611 to indicate that the corresponding worker queues of worker thread 615 and/or worker thread 617 are drained to cause the Rx/Sched thread 611 to modify the schedule so that the flow of the data packets is then returned to the worker threads 615 and 617.

In some embodiments, the operating state of only one of the first logical core allocated to execute worker thread 615 or the second logical core allocated to execute worker thread 617 is caused to change to from the active state to the active state in response to determining the packet rate (PktRate) exceeds the second threshold value.

In this example, to facilitate operation of the communication network, Rx/Sched thread 611 keeps the operating state of the third processor 605 in the active state so that worker thread 619 executed by the first logical core of the third processor 605 and worker thread 621 executed by the second logical core of the third processor 605 are running at a peak processor utilization during when the packet PktRate is lower than a first threshold that is a low water mark (Lwm) value and lower than the second threshold value that is the high water mark (Hwm). When the packet rate PktRate is above the second threshold value, the Rx/Sched thread 611 and the second processor 603 is returned to the active state so that an increase in communication network demand indicated by the increase in the packet rate is met by activating the second processor 603 so as to make it possible for worker thread 615 and worker thread 617 to process the increased flow of data packets compared to when the second processor 605 was in the sleep state and the flow of the data packets was below the first threshold value.

In some embodiments, an operating state of at least one of the first logical core of the third processor 605 allocated to execute worker thread 619 or the second logical core of the third processor 605 allocated to execute worker thread 621 is changed from an active state to a peak utilization state in response to determining the packet rate PktRate is greater than the first threshold value and less than the second threshold value. In some embodiments, at least one of worker thread 619 or worker thread 621 in the peak utilization state processes the data packets at a speed that is faster than the at least one of worker thread 619 or worker thread 621 processes the data packets in the active state. In some embodiments, the peak utilization state is an overclocking percentage that is activated to facilitate the faster processing of the data packets.

In some embodiments, at least one of the first logical core of the third processor 605 allocated to execute worker thread 619 or the second logical core of the third processor 605 allocated to execute worker thread 621 is caused to be in the peak utilization state at a time during which the at least one of the first logical core of the second processor 603 allocated to execute worker thread 615 or the second logical core of the second processor 603 allocated to execute worker thread 615 is in the sleep state before operation 657, 659 and/or 661 is completed. In some embodiments, in response to the operating state of the first logical core of the second processor 603 allocated to execute worker thread 615 and/or the second logical core of the second processor 603 allocated to execute worker thread 615 being transitioned from the sleep state to the active state, the first logical core of the third processor 605 allocated to execute worker thread 619 and/or the second logical core of the third processor 605 allocated to execute worker thread 621 that was in the peak utilization state, is transitioned to the active state.

In some embodiments, the adaptive capabilities of putting a processor into a sleep state and returning the processor to an active state based on the calculated packet rate helps to reduce power consumption is reduced compared to an operating state wherein both the second processor 503 and the third processor 505 are in the active state, while also quickly returning from a sleep state to an active state so as to meet communication network operation demands without service interruption of data packet processing delays.

FIG. 7 is a functional block diagram of a computer or processor-based system 700 upon which or by which an embodiment is implemented.

Processor-based system 700 is programmed to adaptively manage power consumption of network devices in a communication network, as described herein, and includes, for example, bus 701, processor 703, and memory 705 components.

In some embodiments, the processor-based system is implemented as a single "system on a chip." Processor-based system 700, or a portion thereof, constitutes a mechanism for performing one or more operations of adaptively managing power consumption of network devices in a communication network.

In some embodiments, the processor-based system 700 includes a communication mechanism such as bus 701 for transferring and/or receiving information and/or instructions among the components of the processor-based system 700. Processor 703 is connected to the bus 701 to obtain instructions for execution and process information stored in, for example, the memory 705. In some embodiments, the processor 703 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of the processor 703. Similarly, an ASIC is configurable to perform specialized functions not easily performed by a more general-purpose processor. Other specialized components to aid in performing the functions described herein optionally include one or more field programmable gate arrays (FPGA), one or more controllers, or one or more other special-purpose computer chips.

In one or more embodiments, the first processor (or multiple processors) 703 performs a set of operations on information as specified by a set of instructions stored in memory 705 related to adaptively managing power consumption of network devices in a communication network. The execution of the instructions causes the processor to perform specified functions.

The processor 703 and accompanying components are connected to the memory 705 via the bus 701. The memory 705 includes one or more of dynamic memory (e.g., RAM, magnetic disk, writable optical disk, etc.) and static memory (e.g., ROM, CD-ROM, etc.) for storing executable instructions that when executed perform the operations described herein to facilitate adaptively managing power consumption of network devices in a communication network. The memory 705 also stores the data associated with or generated by the execution of the operations.

In one or more embodiments, the memory 705, such as a random-access memory (RAM) or any other dynamic storage device, stores information including processor instructions for adaptively managing power consumption of network devices in a communication network. Dynamic memory allows information stored therein to be changed. RAM allows a unit of information stored at a location called a memory address to be stored and retrieved independently of information at neighboring addresses. The memory 705 is also used by the processor 703 to store temporary values during execution of processor instructions. In various embodiments, the memory 705 is a read only memory (ROM) or any other static storage device coupled to the bus 701 for storing static information, including instructions, that is not capable of being changed by processor 703. Some memory is composed of volatile storage that loses the information stored thereon when power is lost. In some embodiments, the memory 705 is a non-volatile (persistent) storage device, such as a magnetic disk, optical disk, or flash card, for storing information, including instructions, that persists even when the system 700 is turned off or otherwise loses power.

The term "computer-readable medium" as used herein refers to any medium that participates in providing information to processor 703, including instructions for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

Various embodiments of this description include the following examples.

Example [1] is an apparatus comprising a first processor and a memory having instructions stored thereon that, when executed by the first processor, cause the apparatus to monitor a flow of data packets on a network plane. The apparatus is also caused to calculate a packet rate of the flow of the data packets. The apparatus is further caused to compare the packet rate with a first threshold value. The apparatus is additionally caused to, in response to determining the packet rate is less than the first threshold value, cause an operating state of a second processor communicatively coupled with the apparatus to change from an active state to a sleep state.

Example [2] is an apparatus according to Example [1], wherein the apparatus is further caused to compare the packet rate with a second threshold value higher than the first threshold value. The apparatus is also caused to, in response to determining the packet rate is greater than the second threshold value, cause the operating state of the second processor to change from the sleep state to the active state.

Example [3] is an apparatus according to any one of Examples [1] to [2], wherein the first threshold value is a first percentage of a maximum packet rate, the second threshold value is a second percentage of the maximum packet rate, and one or more of the first percentage or the second percentage is variable based on a predefined schedule.

Example [4] is an apparatus according to any one of Examples [1] to [3], wherein the second processor comprises a first logical core and a second logical core, the first logical core is allocated to a first worker thread that processes the data packets, the second logical core is allocated to a second worker thread that processes the data packets. The apparatus causes the operating state of the second processor to change from the active state to the sleep state by causing at least one of the first logical core or the second logical core to enter the sleep state in response to determining the packet rate is below the first threshold value.

Example [5] is an apparatus according to any one of Examples [1] to [4], wherein the apparatus is further caused to monitor a packet queue of the second processor, the packet queue having one or more to-be-processed data packets. The apparatus is also caused to, in response to determining the packet queue is fully drained of the one or more to-be-processed data packets, cause the second processor is caused to enter a second sleep state that is a deeper sleep state than the first sleep state.

Example [6] is an apparatus according to any one of Examples [1] to [5], wherein a third processor communicatively coupled with the apparatus comprises a third logical core and a fourth logical core, the third logical core is allocated to a third worker thread that processes the data packets, the fourth logical core is allocated to a fourth worker thread that processes the data packets. The apparatus is further caused to compare the packet rate with a second threshold value higher than the first threshold value. The apparatus is also caused to cause the operating state of the at least one of the first logical core or the second logical core to change from the sleep state to the active state in response to determining the packet rate is greater than the second threshold value. The apparatus is also caused to cause an operating state of at least one of the third logical core or the fourth logical core to be in the active state in response to determining the packet rate is greater than the first threshold value and less than the second threshold value.

Example [7] is an apparatus according to any one of Examples [1] to [6], wherein a third processor communicatively coupled with the apparatus comprises a third logical core and a fourth logical core, the third logical core is allocated to a third worker thread that processes the data packets, the fourth logical core is allocated to a fourth worker thread that processes the data packets. The apparatus is further caused to compare the packet rate with a second threshold value higher than the first threshold value. The apparatus is also caused to cause the operating state of the at least one of the first logical core or the second logical core to change from the sleep state to the active state in response to determining the packet rate is greater than the second threshold value. The apparatus is further caused to cause an operating state of at least one of the third logical core or the fourth logical core to change from the active state to a peak utilization state in response to determining the packet rate is greater than the first threshold value and less than the second threshold value, wherein the at least one of the third worker thread or the fourth worker thread in the peak utilization state processes the data packets at a speed that is faster than the at least one of the third worker thread or the fourth worker thread processes the data packets in the active state.

Example [8] is an apparatus according to any one of Examples [1] to [7], wherein the at least one of the third logical core or the fourth logical core is caused to be in the peak utilization state at a time during which the at least one of the first logical core or the second logical core is in the sleep state.

Example [9] is an apparatus according to any one of Examples [1] to [8], wherein the network plane is a radio access network plane.

Example [10] is a method comprising monitoring, by a first processor, a flow of data packets on a network plane. The method also comprises calculating a packet rate of the flow of the data packets. The method further comprises comparing the packet rate with a first threshold value. The method additionally comprises, in response to determining the packet rate is less than the first threshold value, causing an operating state of a second processor communicatively coupled with the first processor to change from an active state to a sleep state.

Example [11] is a method according to Example [10], further comprising comparing the packet rate with a second threshold value higher than the first threshold value. The method also comprises, in response to determining the packet rate is greater than the second threshold value, causing the operating state of the second processor to change from the sleep state to the active state.

Example [12] is a method according to any one of Examples [10] to [11], wherein the first threshold value is a first percentage of a maximum packet rate, the second threshold value is a second percentage of the maximum packet rate, and one or more of the first percentage or the second percentage is variable based on a predefined schedule.

Example [13] is a method according to any one of Examples [10] to [12], wherein the second processor comprises a first logical core and a second logical core, the first logical core is allocated to a first worker thread that processes the data packets, the second logical core is allocated to a second worker thread that processes the data packets. The causing the operating state of the second processor to change from the active state to the sleep state comprises causing at least one of the first logical core or the second logical core to enter the sleep state in response to determining the packet rate is below the first threshold value.

Example [14] is a method according to any one of Examples [10] to [13], wherein the sleep state is a first sleep state. The method further comprises monitoring a packet queue of the second processor, the packet queue having one or more to-be-processed data packets. The method also comprises, in response to determining the packet queue is fully drained of the one or more to-be-processed data packets, causing the second processor to enter a second sleep state that is a deeper sleep state than the first sleep state.

Example [15] is a method according to any one of Examples [10] to [14], wherein a third processor communicatively coupled with the first processor comprises a third logical core and a fourth logical core, the third logical core is allocated to a third worker thread that processes the data packets, the fourth logical core is allocated to a fourth worker thread that processes the data packets. The method further comprises comparing the packet rate with a second threshold value higher than the first threshold value. The method also comprises causing the operating state of the at least one of the first logical core or the second logical core to change from the sleep state to the active state in response to determining the packet rate is greater than the second threshold value. The method additionally comprises causing an operating state of at least one of the third logical core or the fourth logical core to be in the active state in response to determining the packet rate is greater than the first threshold value and less than the second threshold value.

Example [16] is a method according to any one of Examples [10] to [15], wherein a third processor communicatively coupled with the first processor comprises a third logical core and a fourth logical core, the third logical core is allocated to a third worker thread that processes the data packets, the fourth logical core is allocated to a fourth worker thread that processes the data packets. The method further comprises comparing the packet rate with a second threshold value higher than the first threshold value. The method also comprises causing the operating state of the at least one of the first logical core or the second logical core to change from the sleep state to the active state in response to determining the packet rate is greater than the second threshold value. The method additionally comprises causing an operating state of at least one of the third logical core or the fourth logical core to change from the active state to a peak utilization state in response to determining the packet rate is greater than the first threshold value and less than the second threshold value, wherein the at least one of the third worker thread or the fourth worker thread in the peak utilization state processes the data packets at a speed that is faster than the at least one of the third worker thread or the fourth worker thread processes the data packets in the active state.

Example [17] is a method according to any one of Examples [10] to [16], wherein the at least one of the third logical core or the fourth logical core is caused to be in the peak utilization state at a time during which the at least one of the first logical core or the second logical core is in the sleep state.

Example [18] is a method according to any one of Examples [10] to [17], wherein the network plane is a radio access network plane.

Example [19] is a non-transitory computer readable medium having instructions stored thereon that, when executed by a first processor, cause an apparatus to monitor a flow of data packets on a network plane. The apparatus is also caused to calculate a packet rate of the flow of the data packets. The apparatus is further caused to compare the packet rate with a first threshold value. The apparatus is additionally caused to, in response to determining the packet rate is less than the first threshold value, cause an operating state of a second processor communicatively coupled with the apparatus to change from an active state to a sleep state.

Example [20] is a non-transitory computer readable medium according to Example [19], wherein the apparatus is further caused to compare the packet rate with a second threshold value higher than the first threshold value. The apparatus is also caused to, in response to determining the packet rate is greater than the second threshold value, cause the operating state of the second processor to change from the sleep state to the active state.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. Although features of the present disclosure are expressed in certain combinations, it is contemplated that these features can be arranged in any combination and order without departing from the spirit and scope of the present disclosure.

What is claimed is:

1. An apparatus, comprising:
   a first processor; and
   a memory having instructions stored thereon that, when executed by the first processor, cause the apparatus to:
   monitor a flow of data packets on a network plane;
   calculate a packet rate of the flow of the data packets;
   compare the packet rate with a first threshold value; and
   in response to determining the packet rate is less than the first threshold value, modify a schedule of data packet flow to refrain from sending newly received packets to a worker thread executed by a second processor communicatively coupled with the apparatus and cause an operating state of the second processor to change from an active state to a sleep state in response to determining the worker thread processes all packets in a packet queue of the second processor until empty.

2. The apparatus of claim 1, wherein the apparatus is further caused to:
   compare the packet rate with a second threshold value higher than the first threshold value; and
   in response to determining the packet rate is greater than the second threshold value, cause the operating state of the second processor to change from the sleep state to the active state.

3. The apparatus of claim 2, wherein
   the first threshold value is a first percentage of a maximum packet rate,
   the second threshold value is a second percentage of the maximum packet rate, and
   one or more of the first percentage or the second percentage is variable based on a predefined schedule.

4. The apparatus of claim 1, wherein
   the worker thread is a first worker thread that processes the data packets,
   the second processor comprises a first logical core and a second logical core,
   the first logical core is allocated to the first worker thread,
   the second logical core is allocated to a second worker thread that processes the data packets, and
   the apparatus causes the operating state of the second processor to change from the active state to the sleep state by:
   causing at least one of the first logical core or the second logical core to enter the sleep state in response to determining the packet rate is below the first threshold value.

5. The apparatus of claim 4, wherein the sleep state is a first sleep state, and the apparatus is further caused to:
   monitor the packet queue of the second processor, the packet queue having one or more to-be-processed data packets; and
   in response to determining the packet queue is fully drained of the one or more to-be-processed data packets, cause the second processor to enter a second sleep state that is a deeper sleep state than the first sleep state.

6. The apparatus of claim 4, wherein
   a third processor communicatively coupled with the apparatus comprises a third logical core and a fourth logical core,
   the third logical core is allocated to a third worker thread that processes the data packets,
   the fourth logical core is allocated to a fourth worker thread that processes the data packets, and
   the apparatus is further caused to:
   compare the packet rate with a second threshold value higher than the first threshold value;
   cause the operating state of the at least one of the first logical core or the second logical core to change from the sleep state to the active state in response to determining the packet rate is greater than the second threshold value; and
   cause an operating state of at least one of the third logical core or the fourth logical core to be in the active state in response to determining the packet rate is greater than the first threshold value and less than the second threshold value.

7. The apparatus of claim 4, wherein
   a third processor communicatively coupled with the apparatus comprises a third logical core and a fourth logical core,
   the third logical core is allocated to a third worker thread that processes the data packets,
   the fourth logical core is allocated to a fourth worker thread that processes the data packets, and
   the apparatus is further caused to:
   compare the packet rate with a second threshold value higher than the first threshold value;
   cause the operating state of the at least one of the first logical core or the second logical core to change from the sleep state to the active state in response to determining the packet rate is greater than the second threshold value; and
   cause an operating state of at least one of the third logical core or the fourth logical core to change from the active state to a peak utilization state in response to determining the packet rate is greater than the first threshold value and less than the second threshold value, wherein the at least one of the third worker thread or the fourth worker thread in the peak utilization state processes the data packets at a speed that is faster than the at least one of the third worker thread or the fourth worker thread processes the data packets in the active state.

8. The apparatus of claim 7, wherein the at least one of the third logical core or the fourth logical core is caused to be in the peak utilization state at a time during which the at least one of the first logical core or the second logical core is in the sleep state.

9. The apparatus of claim 1, wherein the network plane is a radio access network plane.

10. A method, comprising:
monitoring, by a first processor, a flow of data packets on a network plane;
calculating a packet rate of the flow of the data packets;
comparing the packet rate with a first threshold value; and
in response to determining the packet rate is less than the first threshold value, modifying a schedule of data packet flow to refrain from sending newly received packets to a worker thread executed by a second processor communicatively coupled with the first processor and causing an operating state of the second processor to change from an active state to a sleep state in response to determining the worker thread processes all packets in a packet queue of the second processor until empty.

11. The method of claim 10, further comprising:
comparing the packet rate with a second threshold value higher than the first threshold value; and
in response to determining the packet rate is greater than the second threshold value, causing the operating state of the second processor to change from the sleep state to the active state.

12. The method of claim 11, wherein
the first threshold value is a first percentage of a maximum packet rate,
the second threshold value is a second percentage of the maximum packet rate, and
one or more of the first percentage or the second percentage is variable based on a predefined schedule.

13. The method of claim 10, wherein
the worker thread is a first worker thread that processes the data packets,
the second processor comprises a first logical core and a second logical core,
the first logical core is allocated to the first worker thread,
the second logical core is allocated to a second worker thread that processes the data packets, and
causing the operating state of the second processor to change from the active state to the sleep state comprises:
causing at least one of the first logical core or the second logical core to enter the sleep state in response to determining the packet rate is below the first threshold value.

14. The method of claim 13, wherein the sleep state is a first sleep state, and the method further comprises:
monitoring the packet queue of the second processor, the packet queue having one or more to-be-processed data packets; and
in response to determining the packet queue is fully drained of the one or more to-be-processed data packets, causing the second processor to enter a second sleep state that is a deeper sleep state than the first sleep state.

15. The method of claim 13, wherein
a third processor communicatively coupled with the first processor comprises a third logical core and a fourth logical core,
the third logical core is allocated to a third worker thread that processes the data packets,
the fourth logical core is allocated to a fourth worker thread that processes the data packets, and
the method further comprises:
comparing the packet rate with a second threshold value higher than the first threshold value;
causing the operating state of the at least one of the first logical core or the second logical core to change from the sleep state to the active state in response to determining the packet rate is greater than the second threshold value; and
causing an operating state of at least one of the third logical core or the fourth logical core to be in the active state in response to determining the packet rate is greater than the first threshold value and less than the second threshold value.

16. The method of claim 13, wherein
a third processor communicatively coupled with the first processor comprises a third logical core and a fourth logical core,
the third logical core is allocated to a third worker thread that processes the data packets,
the fourth logical core is allocated to a fourth worker thread that processes the data packets, and
the method further comprises:
comparing the packet rate with a second threshold value higher than the first threshold value;
causing the operating state of the at least one of the first logical core or the second logical core to change from the sleep state to the active state in response to determining the packet rate is greater than the second threshold value; and
causing an operating state of at least one of the third logical core or the fourth logical core to change from the active state to a peak utilization state in response to determining the packet rate is greater than the first threshold value and less than the second threshold value, wherein the at least one of the third worker thread or the fourth worker thread in the peak utilization state processes the data packets at a speed that is faster than the at least one of the third worker thread or the fourth worker thread processes the data packets in the active state.

17. The method of claim 16, wherein the at least one of the third logical core or the fourth logical core is caused to be in the peak utilization state at a time during which the at least one of the first logical core or the second logical core is in the sleep state.

18. The method of claim 10, wherein the network plane is a radio access network plane.

19. A non-transitory computer readable medium having instructions stored thereon that, when executed by a first processor, cause an apparatus to:
monitor a flow of data packets on a network plane;
calculate a packet rate of the flow of the data packets;
compare the packet rate with a first threshold value; and
in response to determining the packet rate is less than the first threshold value, modifying a schedule of data packet flow to refrain from sending newly received packets to a worker thread executed by a second processor communicatively coupled with the first processor and causing an operating state of the second processor to change from an active state to a sleep state in response to determining the worker thread processes all packets in a packet queue of the second processor until empty.

20. The non-transitory computer readable medium of claim 19, wherein the apparatus is further caused to:
compare the packet rate with a second threshold value higher than the first threshold value; and
in response to determining the packet rate is greater than the second threshold value, cause the operating state of the second processor to change from the sleep state to the active state.

* * * * *